(12) United States Patent
Schmidt et al.

(10) Patent No.: US 8,026,629 B2
(45) Date of Patent: Sep. 27, 2011

(54) MEDIUM VOLTAGE LAND CONNECTION FOR MARINE VESSELS

(75) Inventors: Hans-Erhard Schmidt, Melbeck (DE); Manfred Steinke, Hamburg (DE); Dieter Wieck, Rosengarten (DE)

(73) Assignee: Siemens Aktiengesellschaft, Munich (DE)

( * ) Notice: Subject to any disclaimer, the term of this patent is extended or adjusted under 35 U.S.C. 154(b) by 761 days.

(21) Appl. No.: 11/814,992

(22) PCT Filed: Jan. 25, 2006

(86) PCT No.: PCT/EP2006/050434
§ 371 (c)(1),
(2), (4) Date: Jul. 30, 2007

(87) PCT Pub. No.: WO2006/079636
PCT Pub. Date: Aug. 3, 2006

(65) Prior Publication Data
US 2009/0302687 A1     Dec. 10, 2009

(30) Foreign Application Priority Data

Jan. 27, 2005   (DE) .................. 10 2005 004 628

(51) Int. Cl.
*B60L 1/00*        (2006.01)
(52) U.S. Cl. ........................................... 307/9.1
(58) Field of Classification Search ............. 307/9.1; 191/12.4, 12 R, 12.2 R
See application file for complete search history.

(56) References Cited

U.S. PATENT DOCUMENTS

| | | | | |
|---|---|---|---|---|
| 3,636,409 A | * | 1/1972 | Stephens et al. | 361/43 |
| 4,140,229 A | * | 2/1979 | Booth et al. | 414/308 |
| 4,816,980 A | | 3/1989 | Wiendl | |
| 6,031,737 A | * | 2/2000 | Green | 363/37 |
| 6,329,725 B1 | * | 12/2001 | Woodall et al. | 307/19 |
| 6,972,972 B2 | * | 12/2005 | Duncan et al. | 363/56.01 |
| 7,228,206 B2 | | 6/2007 | Kahle et al. | |

FOREIGN PATENT DOCUMENTS

| | | |
|---|---|---|
| DE | 1123043 B | 2/1962 |
| DE | 3300703 A1 | 7/1984 |

(Continued)

OTHER PUBLICATIONS

Nelson, J.P.; Burns, D.; Seitz, R.; Leoni, A.; , "The grounding of marine power systems: problems and solutions," Petroleum and Chemical Industry Technical Conference, 2004. Fifty-First Annual Conference 2004 , vol., No., pp. 151-161, Sep. 13-15, 2004.*

(Continued)

*Primary Examiner* — Jared Fureman
*Assistant Examiner* — Daniel Cavallari
(74) *Attorney, Agent, or Firm* — Laurence A. Greenberg; Warner H. Stemer; Ralph E. Locher

(57) ABSTRACT

A device for electrically connecting a polyphase ship distribution network to a polyphase land supply network includes a connection unit for connecting the land supply network. The connection unit is connected to a back-to-back link by way of an input transformer, the link having current converters that are interconnected via at least one direct current voltage circuit. An output transformer is connected downstream of the back-to-back link. The output voltage of the transformer lies between 5 and 50 kV. The output transformer can be connected to the ship distribution network via a single multiphase interconnecting cable.

9 Claims, 2 Drawing Sheets

FOREIGN PATENT DOCUMENTS

| | | | |
|---|---|---|---|
| DE | 4018748 | A1 | 12/1991 |
| DE | 101 04 892 | A1 | 8/2002 |
| EP | 0 299 275 | A1 | 1/1989 |
| EP | 0730333 | A2 | 9/1996 |
| WO | 0193410 | A1 | 12/2001 |

OTHER PUBLICATIONS

Environ International Corporation Los Angeles, California: "Cold Ironing Cost Effectiveness Studies, Volume I-Report", pp. 1-128, Mar. 30, 2004.

MariTerm AB: "Shore-Side Electricity for Ships in Ports", Case Studies with Estimates of Internal and External Costs, prepared for the North Sea Commission, Report Aug. 23, 2004.

Flottemesch et al.: "Optimized Energy Exchange in Primary Distribution Networks with DC Links", 2004 IEEE International Conference on Electric Utility Deregulation, Restructuring and Power Technologies (DRPT2004), pp. 108-116, Hong Kong, Apr. 2004.

Germanischer Lloyd: "Klassifikations- und Bauvorschriften I Schiffstechnik, 1 Seeschiffe, 3 Elektrische Anlagen", 2004 Edition.

Siemens AG: "Protolon Reeling and trailing cables 0.6/1kV to 33kV", pp. 1-17, 1991.

Giercke et al.: "Umsetzung der Agenda 21 in europäischen Seehäfen am Beispiel Lübeck-Travemünde", published in the Umweltforschungsplan des Bundesministers für Umwelt, Naturschutz und Reaktorsicherheit, Forschungsbericht UBA FuE-Vorhaben: FKZ 201 96 105, Dec. 2004.

New Hansa of Sustainable Ports and Cities: "Towards Sustainable Port Policy around the Baltic Sea", Project Newsletter 1/3, Oct. 2004.

Port of Long Beach, Engineering Division: "Port of Long Beach—Shore to Ship Power Design Standards", pp. 1-3, Feb. 24, 2004.

Pablo Cotarelo: "Worst in Spain", published in Acid News in Sep. 2004.

Tom Dow, Vice President, Public Affairs, Carnival Corporation & PLC: "Charting the Course", Marine Fuel Efficiency and Emissions Conference, Toronto, Ontario, Jan. 18-19, 2005.

POLA Marketing: "Alternative Maritime Power at the Port of Los Angeles", Nov. 9, 2004.

Cavotec Group: "Flexible power and control cables", pp. 1-32, Jul. 2003.

Janssen et al., "Residual current compensation (RCC) for resonant grounded transmission systems using high performance voltage inverter", Sep. 7, 2003, 3003 IEEE PES Transmission and Distribution Conference. Conference Proceedings, Dallas, TX Sep. 7-12, 2003, IEEE/PES Transmission and Distribution Conference and Exposition, New York, NY: IEEE , US, pp. 574-578, XP 010725503,ISBN:0-7803-8110-6.

European Office Action dated Apr. 2, 2009.

* cited by examiner

MEDIUM VOLTAGE LAND CONNECTION FOR MARINE VESSELS

BACKGROUND OF THE INVENTION

Field of the Invention

The invention relates to an apparatus for electrical connection of a polyphase marine-vessel distribution system to a polyphase land power supply system.

The invention also relates to a method for electrical connection of a polyphase marine-vessel distribution system to a land power supply system.

An apparatus such as this and a method such as this are already known from the appropriate prior art. For example, it is already known for the AC voltage from a land power supply system to be converted via an expedient three-phase transformer from about 34 kV to 6.6 kV. In this case, the transformer is followed by a switchgear assembly, whose cable outgoer can be connected to a second transformer, which transforms the 6.6 kV medium voltage to the low-voltage range. On the low-voltage side, the second transformer is connected to a low-voltage switchgear cabinet, from which the electrical power is transmitted via a multiplicity of marine-vessel connection cables to the marine vessel.

The abovementioned apparatus has the disadvantage that the only marine-vessel distribution systems which can be connected are those whose frequency, phase or star-point connection match the land power supply system. However, in practice, such a match occurs only rarely. Furthermore, the use of a plurality of cable connections to transmit power to the marine vessel is at the same time complex, since a plurality of plug connections must be joined together for connection of the marine-vessel distribution system. This is time-consuming and is not user-friendly, particularly in poor weather conditions.

The connection of a marine-vessel distribution system to a power supply system on land has become considerably more important recently. In the past, the marine-vessel distribution system was fed from a marine vessel in harbor by operation of the marine-vessel auxiliary engines. The auxiliary engines are coupled to generators, thus generating the required electrical power. However, the exhaust gases and the noise from the auxiliary engines result in severe environmental pollution. This is considered to be particularly disturbing in densely populated harbor towns. Furthermore, the auxiliary engines, which are normally in the form of diesel engines, consume a large amount of fuel, so that this type of power generation is also costly.

SUMMARY OF THE INVENTION

The object of the invention is therefore to provide an apparatus and a method of the type mentioned initially, but which allow electrical current to be supplied to marine vessels cost-effectively and flexibly.

The invention achieves this object according to a first variant by an apparatus for electrical connection of a polyphase marine-vessel distribution system to a polyphase land power supply system using a connecting unit for connecting to the land power supply system, which connecting unit is connected via an input transformer to a back-to-back link, which has converters which are connected to one another via at least one DC circuit, with the back-to-back link being followed by an output transformer whose output voltage is in the range between 5 and 50 kV and which can be connected via a single polyphase connection line to the marine-vessel distribution system.

According to a second variant, the invention achieves this object by a method for electrical connection of a marine-vessel distribution system to a land power supply system, in which a polyphase marine-vessel connection line is connected to a polyphase connection line via connection means, with the connection line being connected via an output transformer to a back-to-back link which is connected via an input transformer to the land power supply system, and in which a control unit then checks the connection means for the serviceability of the connection and, if it is serviceable, accesses a regulation unit for the back-to-back link in order to provide the power supply for the marine-vessel distribution system by the land power supply system.

The apparatus according to the invention produces a medium-voltage connection between the marine-vessel power supply system and a land power supply system. In the case of currents which are comparable to those in a cable connection according to the prior art, more electrical power is therefore transmitted via the connection line, according to the invention. This means that only one connection line and one connection means are required for connection of the marine vessel. The back-to-back link is used for flexible connection of all types of marine-vessel distribution systems and comprises two converters which are arranged physically close to one another, or in other words two converters arranged back-to-back, which are connected to one another via DC cables. The back-to-back link is likewise designed for medium voltage and has a regulation unit, which allows the respective conversion to be controlled. In particular, the regulation unit makes it possible to generate virtually any desired frequencies at the AC output of the converter. The output transformer converts the output of the back-to-back link to the desired medium-voltage potential. In principle, this is between 5 and 50 kV, and in particular between 6 and 12 kV.

According to one advantageous further development, the connection line is a cable, with the cable being passed via a cable drum with tension control. The cable represents a flexible connection line. The cable drum with tension control compensates, for example, for the tidal movement of the marine vessel, thus avoiding undesirable mechanical stresses in the connection line between the marine vessel and land, according to the invention. Cable drums with tension control are known to those skilled in the art, so that there is no need to describe them at this point.

The connection line advantageously has at least one optical waveguide, which is connected to the back-to-back link. A known coupling of each optical waveguide of the connection line to an optical waveguide which leads to a control unit which, for example, is arranged on the marine vessel, provides a communication line between the back-to-back link and the control unit, which can be produced by a single plug connection. In one preferred exemplary embodiment, six optical waveguides are provided in the connection line, and can be coupled in a known manner via one expedient plug connection to six optical waveguides in a marine-vessel connection line, or a marine-vessel hawser.

According to one preferred further development of the invention, the connection line has a first plug part, whose shape is designed to be complementary to a second plug part which is connected to the marine-vessel distribution system via a polyphase marine-vessel connection line. The plug connection which is formed in this way allows quick connection of the marine-vessel distribution system to the land power supply system. Particularly if the connection line and the marine-vessel connection line each have optical waveguides which can be associated, the plug connection provides not only the electrical connection but also communication lines for setting the regulation of the back-to-back link.

The marine-vessel connection line advantageously has fuses for protecting the marine-vessel distribution system against short-circuit currents. In contrast to this, the fuses are also suitable for protection against overvoltage.

A switchgear assembly is expediently arranged between the input transformer and the land power supply system. The switchgear assembly expediently has a commercially available protective device and a circuit breaker, which is designed to switch short-circuit currents in the medium-voltage range between 1 kV and 72 kV.

The converters expediently have a bridge circuit formed by self-commutated power semiconductor valves.

Bridge circuits of converters such as these are very well known to those skilled in the art, so that there is no need to describe them at this point. Self-commutated converters can be switched, for example, in the kilohertz range, by means of pulse-width modulation. The power semiconductor valves are, for example, so-called IGBTs or GTOs, which are likewise known to those skilled in the art.

The connection line expediently has two conductor phases for electrical bonding between the marine-vessel distribution system and the land power supply system.

According to one advantageous further development of the method, the control unit is arranged on a marine vessel in which the marine-vessel distribution system is located, and accesses the regulation unit via at least one optical waveguide of the marine-vessel connection line, which is coupled via the connection means to an associated optical waveguide, which is connected to the back-to-back link, of the connection line. According to this advantageous further development, it is possible to set the short-circuit coupling as appropriate to its requirements, from the marine vessel. The invention avoids the complex transmission of control data. The control unit is in this case accessed via the single plug connection, so that data interchange lines and power supply can be set up in a short time.

According to one further development relating to this, the control unit transfers control parameters for setting the back-to-back link to the regulation unit. The control parameters allow regulation of the converters for the back-to-back link, so that the latter provides the appropriate frequency or other electrical variables which are expedient for supplying the marine-vessel distribution system.

Further expedient refinements and advantages of the invention are the subject matter of the following description of exemplary embodiments of the invention, with reference to the figures of the drawing, in which parts having the same effect are provided with the same reference symbols, and in which

DETAILED DESCRIPTION OF THE INVENTION

Figure 1:
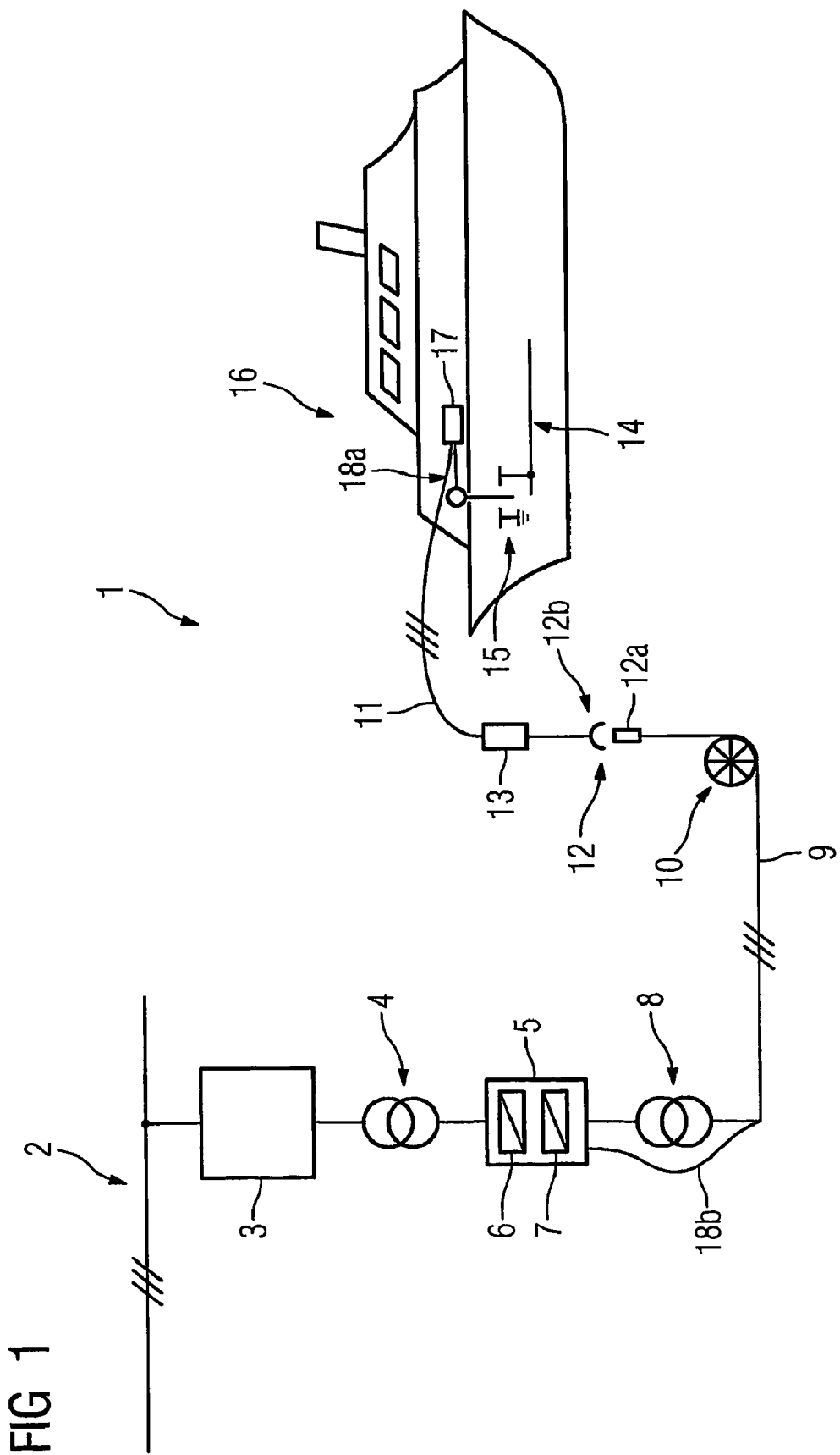
FIG. 1 shows a schematic illustration of one exemplary embodiment of the apparatus according to the invention.

FIG. 1 shows one exemplary embodiment of the apparatus 1 according to the invention, illustrated schematically. In the illustrated exemplary embodiment, a land power supply system 2 is connected to the apparatus 1 via commercially available connecting means, which are not illustrated in the figures. The land power supply system 2 is a three-phase AC power supply system, which is connected to an input transformer 4 via a medium-voltage switchgear assembly 3. The land power supply system 2 in this case has a rated voltage of 36 kV. The transformer 4 comprises a three-phase primary coil and a three-phase secondary coil, which is connected to a back-to-back link 5. The back-to-back link 5 has two converters 6 and 7, which are illustrated only schematically in FIG. 1, and are connected to one another via DC lines, which are not shown in the figures. The output of the back-to-back link 5 is connected to an output transformer 8, at whose output a voltage at a level of 6.6 kV is produced. The phases of the secondary coil of the transformer 8 are connected to one another in a delta. The three current-carrying phases of the secondary coil of the transformer 8 are carried in a connection line 9, which is in the form of a cable and is thus flexible, via a cable drum 10 with tension control, which is intended to compensate for the tidal movement of the marine vessel. Connection means 12 are used to connect the connection line 9 to a marine-vessel connection line or marine-vessel hawser 11, and comprise a first plug part 12a and a second plug part 12b, whose shapes are designed to be complementary to one another. By way of example, the first plug part is thus a plug 12a which can be inserted into a plug socket 12b as the second plug part, so as to produce a detachable clamping fit, in which case conventional latching means can be provided.

The marine-vessel connection line 11 is provided with fuses 13, which prevent damage to a marine-vessel distribution system 14 in the event of a short circuit. The marine-vessel distribution system 14 is likewise in the form of a three-phase AC power supply system, which, in addition to the fuses 13, also has a switching unit 15, which is indicated only schematically. The marine-vessel distribution system 14 and the switchgear assembly 15 are arranged on a schematically indicated marine vessel 16, which is in a harbor. The marine vessel 16 also has a control unit 17, which is connected to the back-to-back link via six optical waveguides 18a and 18b. The six optical waveguides 18a and 18b are bundled together with the three electrically conductive phase conductors and two electrical bonding conductors to form the marine-vessel connection line 11. For this purpose, the marine-vessel connection conductor 11 has, for example, expedient external insulation composed of plastic, rubber or the like. The marine-vessel connection line is therefore in the form of a cable. A corresponding situation applies to the three-phase conductors and two electrical bonding conductors, and to the six optical waveguides 18b in the connection line 9. Both the coupling of the optical waveguides 18a and 18b as well as the electrical connection of the phase conductors are provided via a single plug connection 12a and 12b, or via the connection means 12.

Figure 2:
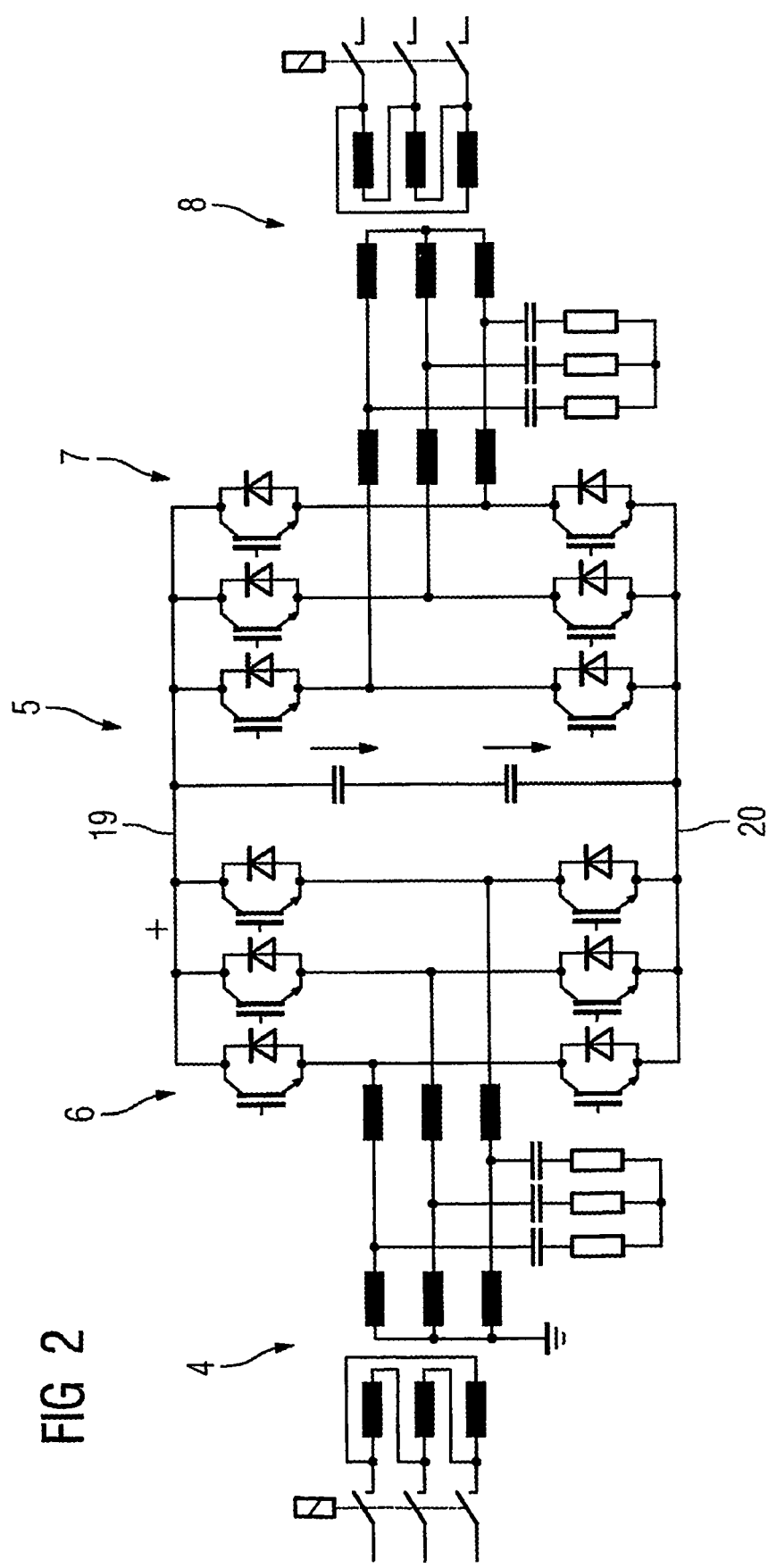
FIG. 2 shows one example of a back-to-back link for use in the apparatus as shown in FIG. 1.

FIG. 2 shows the back-to-back link 5, the input transformer 4 and the output transformer 8, illustrated enlarged. The phases of the secondary winding of the transformers 4 and 8 are respectively connected to one phase of the three-phase converter, which is connected to six "Insulated Gate Bipolar Transistors", or IGBTs for short, with diodes connected back-to-back in parallel, to form a six-pulse bridge. The converters formed from IGBTs are also referred to as pulse-controlled converters, whose self-commutated semiconductor valves can be switched both on and off. The control system normally provides pulse-width modulation at clock frequencies in the range of several kilohertz. DC lines 19 and 20 are provided between the converters 6 and 7, with the converters, when back-to-back links are used, being arranged in the immediate physical vicinity of one another, in a so-called back-to-back configuration.

The invention claimed is:

1. An apparatus for electrically connecting a polyphase marine vessel distribution system to a polyphase shore power supply system, comprising:
   an input transformer having an input for connection to the shore power supply system and an output;
   a back-to-back link connected to said output of said input transformer, said back-to-back link including converters connected to one another;
   an output transformer connected to said back-to-back link, said output transformer having an output providing an output voltage; and
   a single polyphase connection line for connecting said output of said output transformer to the marine-vessel distribution system in order to supply the output voltage to the marine-vessel distribution system;
   said connection line including at least one optical waveguide connected to said back-to-back link.

2. The apparatus according to claim 1, wherein said connection line is a cable, and said cable is passed via a cable drum with tension control.

3. The apparatus according to claim 1, wherein said connection line has a first plug part and a second plug part complementary to said first plug part, and said second plug part is connected to the marine-vessel distribution system via a polyphase marine-vessel connection line.

4. The apparatus according to claim 3, wherein said marine-vessel connection line includes fuses for protecting the marine-vessel distribution system against short-circuit currents.

5. The apparatus according to claim 1, which comprises a switchgear assembly connected between said input transformer and the shore power supply system.

6. The apparatus according to claim 1, wherein said converters have a bridge circuit formed by self-commutated power semiconductor valves.

7. The apparatus according to claim 1, wherein said connection line has two conductor phases.

8. The apparatus according to claim 1, wherein the output voltage is in a range between 5 kV and 50 kV.

9. The apparatus according to claim 1, further comprising a control unit connected to said back-to-back link by said at least one optical waveguide.

* * * * *